(12) United States Patent
Shamis et al.

(10) Patent No.: US 7,980,064 B2
(45) Date of Patent: Jul. 19, 2011

(54) ALGORITHM INCORPORATING DRIVING CONDITIONS INTO LNT REGENERATION SCHEDULING

(75) Inventors: Dmitry Arie Shamis, Commerce Township, MI (US); James Edward McCarthy, Jr., Canton, MI (US); Johannes Walter Reuter, Ypsilanti, MI (US); Karen Evelyn Bevan, Northville, MI (US); Christian Thomas Chimner, Royal Oaks, MI (US)

(73) Assignee: Eaton Corporation, Cleveland, OH (US)

( * ) Notice: Subject to any disclaimer, the term of this patent is extended or adjusted under 35 U.S.C. 154(b) by 1045 days.

(21) Appl. No.: 11/820,315

(22) Filed: Jun. 19, 2007

(65) Prior Publication Data

US 2008/0314031 A1    Dec. 25, 2008

(51) Int. Cl.
*F01N 3/00* (2006.01)
*F01N 3/10* (2006.01)

(52) U.S. Cl. .............. 60/295; 60/274; 60/285; 60/301

(58) Field of Classification Search .............. 60/274, 60/276, 285, 286, 290, 295, 297, 301, 303
See application file for complete search history.

(56) References Cited

U.S. PATENT DOCUMENTS

| | | | |
|---|---|---|---|
| 5,740,669 A | 4/1998 | Kingusa et al. | |
| 5,771,685 A | 6/1998 | Hepburn | |
| 5,771,686 A * | 6/1998 | Pischinger et al. | 60/274 |
| 5,894,725 A * | 4/1999 | Cullen et al. | 60/274 |
| 6,032,461 A | 3/2000 | Kingusa et al. | |
| 6,047,542 A * | 4/2000 | Kinugasa et al. | 60/274 |
| 6,109,024 A | 8/2000 | Kingusa et al. | |
| 6,134,883 A | 10/2000 | Kato et al. | |
| 6,167,695 B1 | 1/2001 | Itou et al. | |
| 6,171,565 B1 | 1/2001 | Hoehne et al. | |
| 6,205,773 B1 | 3/2001 | Suzuki | |
| 6,370,868 B1 | 4/2002 | Kolmanovsky et al. | |
| 6,427,437 B1 | 8/2002 | Bidner et al. | |
| 6,434,930 B1 | 8/2002 | Cullen et al. | |
| 6,453,666 B1 | 9/2002 | Surnilla et al. | |
| 6,460,329 B2 | 10/2002 | Shimotani et al. | |
| 6,487,853 B1 | 12/2002 | Hepburn et al. | |
| 6,499,291 B2 | 12/2002 | Lang et al. | |
| 6,499,293 B1 | 12/2002 | Surnilla et al. | |
| 6,502,387 B1 | 1/2003 | Asik et al. | |
| 6,508,057 B1 | 1/2003 | Bouchez et al. | |
| 6,519,930 B1 | 2/2003 | Maus et al. | |

(Continued)

OTHER PUBLICATIONS

Office action mailed Sep. 2, 2010 in U.S. Appl. No. 11/820,332, filed Jun. 19, 2007 (same day as the present application). The specification is substantially the same. Applicant suggests checking for arguments applicable to the present case and for overlapping claims.

*Primary Examiner* — Thomas E Denion
*Assistant Examiner* — Audrey Klasterka
(74) *Attorney, Agent, or Firm* — Paul V. Keller, PLC

(57) ABSTRACT

A lean $NO_x$ trap is a diesel exhaust aftertreatment system is selectively denitrated based on a measure relating to the state and/or the performance of the exhaust aftertreatment system, or a portion thereof comprising the lean $NO_x$ trap, reaching a critical value. The critical value is varied according to the demands currently being place on the exhaust aftertreatment system. In one embodiment, the critical value is set based on engine speed-load information. The method regenerates more frequently when exhaust aftertreatment demands are high and less frequently when demands are low. The method improves aftertreatment performance while reducing aftertreatment fuel penalty.

2 Claims, 3 Drawing Sheets

U.S. PATENT DOCUMENTS

| | | | |
|---|---|---|---|
| 6,546,718 B2 | 4/2003 | Hepburn et al. | |
| 6,615,579 B2 | 9/2003 | Nishiyama | |
| 6,619,108 B2 | 9/2003 | Birkhofer et al. | |
| 6,684,631 B2 | 2/2004 | Surnilla et al. | |
| 6,732,507 B1* | 5/2004 | Stanglmaier et al. | 60/285 |
| 6,823,843 B1 | 11/2004 | Goralski, Jr. et al. | |
| 6,829,885 B2 | 12/2004 | Surnilla et al. | |
| 6,843,240 B1 | 1/2005 | Hahn et al. | |
| 6,862,880 B2 | 3/2005 | Schnaibel et al. | |
| 6,882,929 B2 | 4/2005 | Liang et al. | |
| 6,889,497 B2 | 5/2005 | Schnaibel et al. | |
| 6,925,796 B2 | 8/2005 | Nieuwstadt et al. | |
| 6,925,797 B2 | 8/2005 | Taga et al. | |
| 7,082,753 B2 | 8/2006 | Dalla betta et al. | |
| 7,251,930 B2 | 8/2007 | Audouin | |
| 2002/0104311 A1* | 8/2002 | Nishiyama | 60/285 |
| 2003/0089103 A1 | 5/2003 | Hahn et al. | |
| 2003/0172647 A1* | 9/2003 | Tanaka | 60/286 |
| 2004/0216449 A1* | 11/2004 | Szymkowicz et al. | 60/284 |
| 2006/0010857 A1 | 1/2006 | Hu et al. | |
| 2006/0277898 A1* | 12/2006 | McCarthy, Jr. | 60/286 |

* cited by examiner

ALGORITHM INCORPORATING DRIVING CONDITIONS INTO LNT REGENERATION SCHEDULING

FIELD OF THE INVENTION

The present invention relates to diesel power generation systems with exhaust aftertreatment.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling $NO_x$ emissions from diesel-powered vehicles. One set of approaches focuses on the engine. Techniques such as exhaust gas recirculation and partially homogenizing fuel-air mixtures are helpful, but these techniques alone will not eliminate $NO_x$ emissions. Another set of approaches remove $NO_x$ from the vehicle exhaust. These include the use of lean-burn $NO_x$ catalysts, selective catalytic reduction (SCR) catalysts, and lean $NO_x$ traps (LNTs).

Lean-burn $NO_x$ catalysts promote the reduction of $NO_x$ under oxygen-rich conditions. Reduction of $NO_x$ in an oxidizing atmosphere is difficult. It has proven challenging to find a lean-burn $NO_x$ catalyst that has the required activity, durability, and operating temperature range. A reductant such as diesel fuel must be steadily supplied to the exhaust for lean $NO_x$ reduction, introducing a fuel economy penalty of 3% or more. Currently, peak $NO_x$ conversion efficiencies for lean-burn $NO_x$ catalysts are unacceptably low.

SCR generally refers to selective catalytic reduction of $NO_x$ by ammonia. The reaction takes place even in an oxidizing environment. The $NO_x$ can be temporarily stored in an adsorbent or ammonia can be fed continuously into the exhaust. SCR can achieve high levels of $NO_x$ reduction, but there is a disadvantage in the lack of infrastructure for distributing ammonia or a suitable precursor. Another concern relates to the possible release of ammonia into the environment.

LNTs are devices that adsorb $NO_x$ under lean conditions and reduce and release the adsorbed $NO_x$ under rich conditions. An LNT generally includes a $NO_x$ adsorbent and a catalyst. The adsorbent is typically an alkali or alkaline earth compound, such as $BaCO_3$ and the catalyst is typically a combination of precious metals including Pt and Rh. In lean exhaust, the catalyst speeds oxidizing reactions that lead to $NO_x$ adsorption. In a reducing environment, the catalyst activates reactions by which hydrocarbon reductants are converted to more active species, the water-gas shift reaction, which produces more active hydrogen from less active CO, and reactions by which adsorbed $NO_x$ is reduced and desorbed. In a typical operating protocol, a reducing environment will be created within the exhaust from time-to-time to regenerate (denitrate) the LNT.

Regeneration to remove accumulated NOx may be referred to as denitration in order to distinguish desulfation, which is carried out much less frequently. The reducing environment for denitration can be created in several ways. One approach uses the engine to create a rich exhaust-reductant mixture. For example, the engine can inject extra fuel into the exhaust within one or more cylinders prior to expelling the exhaust. A reducing environment can also be created by injecting a reductant into lean exhaust downstream from the engine. In either case, a portion of the reductant is generally expended to consume excess oxygen in the exhaust. To lessen the amount of excess oxygen and reduce the amount of reductant expended consuming excess oxygen, the engine may be throttled, although such throttling may have an adverse effect on the performance of some engines.

Reductant can consume excess oxygen by either combustion or reforming reactions. Typically, the reactions take place upstream of the LNT over an oxidation catalyst or in a fuel reformer. The reductant can also be oxidized directly in the LNT, but this tends to result in faster thermal aging. U.S. Pat. Pub. No. 2003/0101713 describes an exhaust system with a fuel reformer placed in an exhaust line upstream from an LNT. The reformer includes both oxidation and reforming catalysts. The reformer both removes excess oxygen and converts the diesel fuel reductant into more reactive reformate.

Regardless of how the reducing environment is created, it is important to control the frequency with which reducing conditions are created. If the frequency of regeneration is too low, the LNT will fail to perform its function effectively. If the frequency of regeneration is too high, the fuel penalty becomes excessive. In any event, the fuel penalty for regenerating an LNT is a significant factor contributing to the operating cost of a vehicle using an LNT and it is desirable to keep that fuel penalty as low as possible while still meeting emission control objectives.

Numerous methods for scheduling LNT denitrations have been proposed. The simplest method is periodic regeneration: regeneration is conducted after a fixed period of lean operation. This method is generally impractical in that $NO_x$ accumulation rates vary widely over the course of vehicle operation. Using periodic regeneration, either the fuel penalty will be unacceptably high or the emissions control will be unacceptably low.

A prevalent method for scheduling LNT denitration is to schedule based on LNT loading. LNT loading can be characterized in terms of amount of $NO_x$ accumulated, remaining $NO_x$ storage capacity, percent saturation, or another parameter of this type. Numerous methods for estimating $NO_x$ loading and/or remaining $NO_x$ storage capacity have been proposed. These methods generally involve integrating an estimate of the $NO_x$ storage rate and comparing the result to an estimated $NO_x$ storage capacity.

$NO_x$ storage rates can be estimated from differences between $NO_x$ flow rates out of the engine and $NO_x$ flow rates out of the LNT or by multiplying $NO_x$ flow rates out of the engine by estimates of LNT storage efficiency. Engine out $NO_x$ flow rates can be estimated exclusively from engine operating maps or using a $NO_x$ sensor in the exhaust upstream from the LNT. $NO_x$ flow rates out of the LNT, when used, are generally estimated using $NO_x$ concentration sensors.

Regenerating based on LNT loading is better than regenerating periodically, but is still inaccurate in the sense of resulting in overly frequent or infrequent regenerations. Aside from any inaccuracies in measuring $NO_x$ storage rates, it is difficult to accurately determine $NO_x$ storage capacity. $NO_x$ storage capacity varies over time due to factors including, without limitation, sulfur poisoning, catalyst aging, and catalyst temperature. The degree of saturation at which LNT efficiency becomes unacceptably low is also variable being a function of these and other factors.

Another limitation to regenerating based on $NO_x$ loading is that it does not take into account the performance of the entire exhaust treatment system. It is known that an LNT can produce ammonia during denitration and from this knowledge it has been proposed to combine an LNT and an ammonia SCR catalyst into one system. Ammonia produced by the LNT during regeneration is captured by the SCR catalyst for subsequent use in reducing $NO_x$, thereby improving conversion efficiency over a stand-alone LNT with little or no increase in fuel penalty or precious metal usage. Regeneration of an LNT in a hybrid system based on LNT loading only may be premature due to performance of the SCR catalyst in addition to the other factors mentioned above.

An alternative approach is to schedule LNT regeneration based on current performance of the aftertreatment system as determined from $NO_x$ concentration measurements taken downstream from the LNT. These measurements can be used on a standalone basis, regenerating when the downstream concentration exceeds a critical value, or in combination of with estimates of $NO_x$ concentration upstream from the LNT, whereby the LNT performance efficiency can be determined and used as a criteria. The performance of the LNT can be determined individually, or the performance of the LNT in combination with another device, such as an SCR reactor, can be measured.

In spite of advances, there continues to be a long felt need for an affordable and reliable diesel exhaust aftertreatment system that is durable, has a manageable operating cost (including fuel penalty), and reduces $NO_x$ emissions to a satisfactory extent in the sense of meeting U.S. Environmental Protection Agency (EPA) regulations effective in 2010 and other such regulations.

SUMMARY

A difficulty of scheduling LNT regenerations based on $NO_x$ concentration measurements is that this data can be chaotic. Events such as gear changes can cause brief transient increases in exhaust $NO_x$ concentrations downstream from an LNT. The variability of the data is even greater if differential between the $NO_x$ concentration entering the LNT and the $NO_x$ leaving the LNT is calculated in order to estimate the $NO_x$ removal efficiency.

The inventors have observed that $NO_x$ concentration sensor data is particularly chaotic and unreliable in periods immediately following LNT regeneration events, but subsequently becomes more stable. Accordingly, one of the inventors' concepts is a method of operating a diesel power generation system that comprises treating the diesel exhaust with an exhaust aftertreatment system comprising an LNT and denitrating the LNT selectively based on data from a $NO_x$ sensor wherein the decision to denitrate ignores data from the $NO_x$ sensor or places decreased weight on data from that sensor obtained in a period immediately following a denitration. The period immediately follows the preceding denitration. The weight is decreased as compared to the weight placed on data obtained from that sensor after the period. This method reduces premature denitrations and associated fuel expenditures resulting from misleading $NO_x$ concentration data.

Another of the inventors concepts' relates to selectively denitrating the LNT based on both a first and a second criteria being met. The first criteria relates to the amount of $NO_x$ stored in the LNT or remaining $NO_x$ storage capacity of the LNT. The second criteria relates to the current performance of the exhaust treatment system, or a portion thereof, as determined from one or more measurements of $NO_x$ concentration in the exhaust. This method reduces premature denitrations and associated unnecessary fuel expenditures resulting from inaccurate $NO_x$ concentration data and transient events.

The inventors have found that over a typical course of operating a diesel engine opportunities for regenerating at relatively low fuel penalty routinely occur. Advantage of these opportunities can be taken by weighing in the decision to regenerate both the state and or performance of the aftertreatment system comprising the LNT and the conduciveness of current conditions toward regenerating the LNT with a low fuel penalty. According, the inventors conceived a method of operating a power generation system comprising operating a diesel engine to produce a lean exhaust comprising $NO_x$, passing the lean exhaust through an exhaust aftertreatment system comprising an LNT that adsorbs a portion of the $NO_x$ from the exhaust, and selectively denitrating the LNT based on a balance between the state and or performance of the aftertreatment system and the conduciveness of current conditions to regenerating the LNT with a low fuel penalty. The method results in regeneration being advanced when conditions are favorable and postponed when conditions are not favorable, with the ultimate result of greater fuel economy for a given level of emission control. The balance varies a threshold for regeneration.

A threshold for regeneration is a point at which a measure of the state and or performance of the exhaust aftertreatment system comprising the LNT reaches a critical value. In one embodiment, the balancing involves setting the critical value based on conduciveness. In another embodiment, a first factor relating to conduciveness is determined, a second factor relating to urgency of the need to regenerate (depending on state or performance) is determined, and the two factors weighed in a formula that determines whether the time to regenerate has arrived. In this later embodiment, a critical value exists but may never be explicitly calculated.

The inventors also recognize that the urgency of the need to regenerate does not have a static relationship to the state or performance of the exhaust aftertreatment system. The performance requirements for the exhaust aftertreatment system in general and the LNT in particular are not static, but a variable function of the vehicle operating state. For some vehicle operating states the LNT must be maintained at a relatively low level of saturation in order to adequately control NOx emissions. In other vehicle operating states, the LNT continues to meet emission control objectives even at relatively high levels of saturation. Thus, if LNT denitration criteria remains a fixed function of either NOx loading, remaining NOx storage capacity, or NOx mitigation efficiency, regeneration will either be overly frequent and wasteful of fuel or insufficiently frequent to achieve adequate NOx mitigation. Accordingly, the inventors conceive a method of operating a power generation system comprising operating a diesel engine to produce a lean exhaust comprising NOx, passing the lean exhaust through an exhaust aftertreatment system comprising a lean NOx trap that adsorbs a portion of the NOx from the exhaust, and selectively denitrating the lean NOx trap based on a measure relating to $NO_x$ loading, remaining $NO_x$ storage capacity, or performance of the exhaust aftertreatment system or a portion thereof comprising the lean $NO_x$ trap. A critical value for the measure is determined based in part on the vehicle operating state, whereby regeneration is advanced when demands on the aftertreatment system are high and postponed when demands on the aftertreatment system are comparatively low.

Another of the inventors' concepts is to select the critical value based on engine speed-load information. Engine speed-load information can comprise one or more of the engine's current speed, the engine's current load, a gradient in the engine speed, a gradient in the engine load, and other historical information regarding the engines speed and/or load. In general, regeneration is triggered when a measure reaches a critical value. The measure relates to the state or performance of an exhaust aftertreatment system comprising an LNT, or a portion thereof. As described above, at least two of the inventors' concepts involve varying the critical value. In one concept the critical value is varied based on the conduciveness of current conditions to regeneration. In another concept, the critical value is varied based on the demands being placed on the exhaust aftertreatment system. Both conduciveness of current conditions to regeneration and demands placed on the aftertreatment system depend primarily on the engine current speed-load point and the engine's speed-load history, although other factors may be relevant. Nevertheless, because of the important role and ready accessibility of the engine speed-load information, another of the inventors' concepts is to select the critical value based on that information.

The various concepts and methods described in this summary can be used separately or two or more together to improve denitration scheduling over the prior art, thus meeting emission control targets while lessening the associated fuel penalty.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 1:
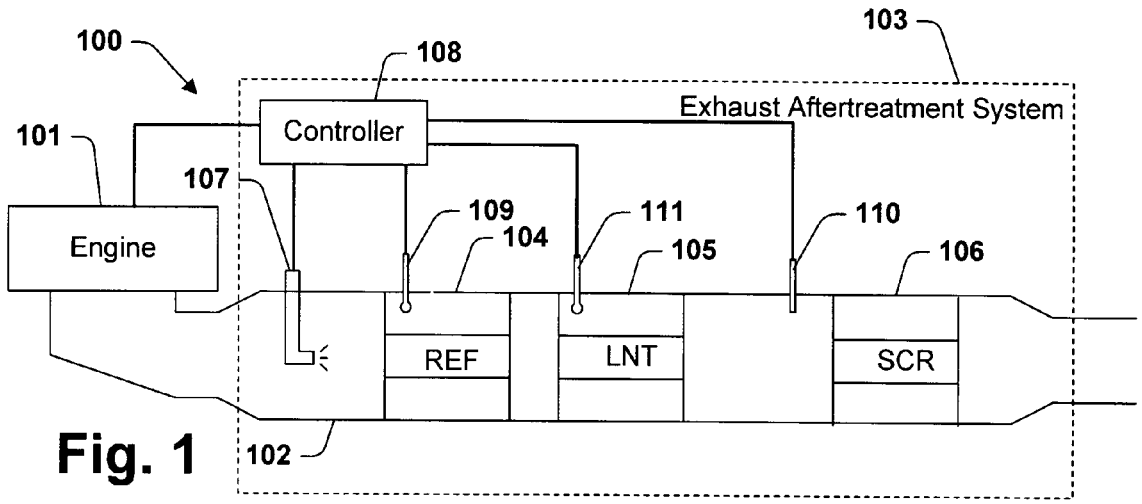
FIG. 1 is a schematic illustration of an exhaust aftertreatment system that can embody various control concepts described herein.

FIG. 1 is a schematic illustration of a power generation system 100 to which various of the inventors' concepts are applicable. The power generation system 100 is not the only power generation system to which the inventors' concepts are applicable, but the various concepts described herein were originally developed for systems like the system 100 and the individual components of the system 100 pertain to preferred embodiments. The power generation system 100 comprises a diesel engine 101 and an exhaust line 102 in which are configured components of an exhaust aftertreatment system 103.

The exhaust aftertreatment system 103 comprises a fuel reformer 104, a lean $NO_x$ trap 105, and an ammonia-SCR catalyst 106. A fuel injector 107 is configured to inject fuel into the exhaust line 102 upstream from the fuel reformer 104. A controller 108 controls the fuel injection based on information about the engine 101, a temperature of the fuel reformer 104 measured by a temperature sensor 109, and a $NO_x$ concentration measurement obtained by the $NO_x$ sensor 110 at a point in the exhaust line 102 downstream from the lean $NO_x$ trap 105. A temperature sensor 111 is configured to measure the temperature of the lean $NO_x$ trap 105, which is particularly important during desulfation.

The diesel engine 101 is a compression ignition engine. A compression ignition diesel engine normally produces exhaust having from about 4 to about 21% $O_2$. An overall rich exhaust-reductant mixture can be formed by injecting diesel fuel into the exhaust during cylinder exhaust strokes, although it is preferred that any reductant be injected into the exhaust downstream from the engine 101. The engine 101 is commonly provided with an exhaust gas recirculation (EGR) system and may also be configured with an intake air throttle, either of which can be used to reduce the exhaust oxygen concentration and lessen the amount of reductant required to produce an overall rich exhaust-reductant mixture. A lean burn gasoline engine or a homogeneous charge compression ignition engine can be used in place of the engine 101. The engine 101 is operative to produce an exhaust that comprises $NO_x$, which is considered to consist of NO and $NO_2$.

The engine 101 is generally a medium or heavy duty diesel engine. The inventors' concepts are applicable to power generation systems comprising light duty diesel and lean burn gasoline engines, but the performance demands of exhaust aftertreatment systems are generally greater when the engine is a medium or heavy duty diesel engine. Minimum exhaust temperatures from lean burn gasoline engines are generally higher than minimum exhaust temperatures from light duty diesel engines, which are generally higher than minimum exhaust temperatures from medium duty diesel engines, which are generally higher than minimum exhaust temperatures from heavy duty diesel engines. Lower exhaust temperatures make $NO_x$ mitigation more difficult and fuel reformers harder to light off. A medium duty diesel engine is one with a displacement of at least about 4 liters, typically about 7 liters. A heavy duty diesel engine is one with a displacement of at least about 10 liters, typically from about 12 to about 15 liters.

The exhaust from the engine 101 is channeled by a manifold to the exhaust line 102. The exhaust line 102 generally comprises a single channel, but can be configured as several parallel channels. The exhaust line 102 is preferably configured without exhaust valves or dampers. In particular, the exhaust line 102 is preferably configured without valves or dampers that could be used to vary the distribution of exhaust among a plurality of LNTs 105 in parallel exhaust channels. The inventors' concepts are applicable to aftertreatment systems with exhaust valves or dampers, but the presence of exhaust valves or dampers can considerably alter the consideration that go into scheduling LNT regeneration. Valves or dampers can be used to reduce the exhaust flow to a fuel processor or LNT, allowing regeneration to be carried out efficiently even when exhaust conditions are unfavorable. Nevertheless, it is preferred that the exhaust line 102 be configured without valves or dampers because these moving parts are subject to failure and can significantly decrease the durability and reliability of an exhaust aftertreatment system.

Even when the exhaust line 102 is free from exhaust valves or dampers, an exhaust line upstream from the exhaust line 102 may still contain an exhaust valve, such as an exhaust gas recirculation (EGR) valve in an EGR line. Exhaust valves are particularly problematic when they are configured within a main exhaust line to divert a majority of the exhaust flow as compared to exhaust valves configured to control the flow through a side branch off a main exhaust line. Exhaust valves for larger conduits are more subject to failure than exhaust valves for smaller conduits.

The exhaust line 102 is provided with an exhaust line fuel injector 107 to create rich conditions for regenerating the LNT 105. The inventors' concepts are applicable to other method's of creating a reducing environment for regenerating the LNT 105, including engine fuel injection of reductant and injection of reductants other than diesel fuel. Nevertheless, it is preferred that the reductant is the same diesel fuel used to power the engine 101. It is also preferred that the reductant be injected into the exhaust line 102, rather than into the cylinders of engine 101, in order to avoid oil dilution caused by fuel passing around piston rings and entering the oil gallery. Additional disadvantages of cylinder reductant injection include having to alter the operation of the engine 101 to support LNT regeneration, excessive dispersion of pulses of reductant, forming deposits on any turbocharger configured between the engine 101 and the exhaust line 102, and forming deposits on any EGR valves.

The diesel fuel is injected into the exhaust line 102 upstream from a fuel reformer 104. The fuel reformer 104 comprises an effective amount of precious metal catalyst, including rhodium, to catalyze oxidation and steam reforming reactions at 600° C. The fuel reformer 104 is designed with low thermal mass, whereby it can be easily heated to steam reforming temperatures for each LNT regeneration. Low thermal mass is typically achieved by constructing the fuel reformer 104 around a thin metal substrate. A thin metal substrate has a thickness that is about 100 μm or less, preferably about 50 μm or less, and still more preferably about 30 μm or less.

Steam reforming temperatures are at least about 500° C., which is generally above diesel exhaust temperatures. Diesel exhaust temperatures downstream from a turbocharger vary from about 110 to about 550° C. Preferably, the fuel reformer 104 can be warmed up and operated using diesel fuel from the injector 107 stating from an initial temperature of 275° C. while the exhaust from the engine 101 remains at 275° C. More preferably, the fuel reformer 104 can be warmed up and operated from initial exhaust and reformer temperatures of 225° C., and still more preferably from exhaust and reformer temperatures of 195° C. These properties are achieved by providing the fuel reformer 104 with effective amounts of precious metals, such as Pt and/or Pd, for catalyzing oxidation of diesel fuel at the starting temperatures. Low temperature start-up can also be improved by configuring a low thermal mass precious metal oxidation catalyst upstream from the fuel reformer 104. Preferably, the upstream catalyst combusts a portion of the fuel while vaporizing the rest. A mixing zone between the upstream catalyst and the fuel reformer 104 is also helpful.

Having the fuel reformer 104 operate at steam reforming temperatures reduces the total amount of precious metal catalyst required. Less precious metal catalyst is required when reforming at steam reforming temperatures as compared to reforming diesel fuel at exhaust temperatures regardless of whether reforming is through partial oxidation and stream reforming or exclusively though partial oxidation reactions.

Having the fuel reformer 104 operate at least partially through steam reforming reactions significantly increases the reformate yield and reduces the amount of heat generation. In principal, if reformate production proceeds through partial oxidation reforming as in the reaction:

1.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust.

Preferably, the fuel reformer 104 comprises enough steam reforming catalyst that at 600° C., with an 8 mol % exhaust oxygen concentration from the engine 101 and with sufficient diesel fuel to provide the exhaust with an overall fuel to air ratio of 1.2:1, at least about 2 mol % reformate is generated by steam reforming, more preferably at least about 4 mol %, and still more preferably at least about 6 mol %. For purposes of this disclosure, functional descriptions involving diesel fuel are tested on the basis of the No. 2 diesel fuel oil sold in the United States, which is a typical diesel fuel.

The inventors' concepts are applicable to power generation systems that do not process injected diesel fuel through fuel reformers comprising steam reforming catalysts. For example, the injected diesel fuel can be combusted to consume excess oxygen in the LNT 106, or in an upstream oxidation catalyst. The injected diesel fuel can also be processed to form reformate by partial oxidation reactions below steam reforming temperatures.

An LNT is a device that adsorbs $NO_x$ under lean conditions and reduces and releases $NO_x$ under rich conditions. An LNT generally comprises a $NO_x$ adsorbent and a precious metal catalyst in intimate contact on an inert support. Examples of $NO_x$ adsorbent materials include certain oxides, carbonates, and hydroxides of alkaline earth metals such as Mg, Ca, Sr, and Ba or alkali metals such as K or Cs. The precious metal typically consists of one or more of Pt, Pd, and Rh. The support is typically a monolith, although other support structures can be used. The monolith support is typically ceramic, although other materials such as metal and SiC are also suitable for LNT supports. The LNT 105 may be provided as two or more separate bricks.

The ammonia-SCR catalyst 106 is functional to catalyze reactions between $NO_x$ and $NH_3$ to reduce $NO_x$ to $N_2$ in lean exhaust. The ammonia-SCR catalyst 106 adsorbs $NH_3$ released from the LNT 105 during denitration and subsequently uses that $NH_3$ to reduce $NO_x$ slipping from the LNT 105 under lean conditions. Examples of ammonia-SCR catalysts include certain oxides of metals such as Cu, Zn, V, Cr, Al, Ti, Mn, Co, Fe, Ni, Mo, W, and Ce and zeolites, such as ZSM-5 or ZSM-11, substituted with metal ions such as cations of Cu, Co, Ag, or Zn. Ammonia-SCR can be accomplished using precious metals, but preferably the SCR catalyst 106 is substantially free of precious metals. Preferably, the ammonia-SCR catalyst 106 is designed to tolerate temperatures required to desulfate the LNT 105.

The exhaust aftertreatment system 100 can comprise other components, such a diesel particulate filter and a clean-up oxidation catalyst. A thermal mass can be placed between the fuel reformer 104 and the LNT 105 to protect the LNT 105 from frequent exposure to high fuel reformer temperatures. A diesel particulate filter can be used as the thermal mass.

During normal operation (a lean phase), the engine 101 is operated to produce an exhaust comprising $NO_x$, particulate matter, and excess oxygen. A portion of the $NO_x$ is adsorbed by the LNT 105. The ammonia-SCR catalyst 106 may have ammonia stored from a previous denitration of the LNT 105. If the ammonia-SCR catalyst 106 contains stored ammonia, an additional portion of the $NO_x$ is reduced over the ammonia-SCR catalyst 106 by reaction with stored ammonia. The fuel injector 107 is generally inactive over this period, although small fuel injections might be used to maintain the fuel reformer 104 at a temperature from which it can be easily heated or to maintain the lean $NO_x$ trap 105 at a temperature at which it effectively absorbs $NO_x$.

From time-to-time, the LNT 105 must be regenerated to remove accumulated $NO_x$ (denitrated) in a rich phase. Denitration generally involves heating the reformer 104 to an operational temperature and then using the reformer 104 to produce reformate. The reformer 104 is generally heated by injecting fuel into the exhaust upstream from the fuel reformer 104 at a sub-stoichiometric rate, whereby the exhaust-reductant mixture remains overall lean and most of the injected fuel completely combusts in the reformer 104. This may be referred to as a lean warm-up phase. Once combustion has heated the reformer 104, the fuel injection rate can be increased and/or the exhaust oxygen flow rate reduced to make the exhaust-reductant mixture overall rich, whereupon the reformer 104 consumes most of the oxygen from the exhaust and produces reformate by partial oxidation and/or steam reforming reactions. The reformate thus produced reduces $NO_x$ absorbed in the LNT 105. Some of the $NO_x$ may be reduced to $NH_3$, which is absorbed and stored by the ammonia-SCR catalyst 106.

Most of the inventors' concepts described herein relate to scheduling the start of denitration. The scheduling is carried out by the controller 108, which provides a control signal once the criteria for initiating a denitration have been met. The controller 108 may also provide a control signal once criteria marking the end of denitration have been met. The controller 108 may be an engine control unit or may be a separate device.

From time to time, the LNT 105 must also be regenerated to remove accumulated sulfur compounds (desulfated). Desulfation involves heating the fuel reformer 104 to an operational temperature, heating the LNT 105 to a desulfating temperature, and providing the heated LNT 105 with a rich atmosphere. Desulfating temperatures vary, but are typically in the range from about 500 to about 800° C., with optimal temperatures typically in the range of about 650 to about 750° C. Below a minimum temperature, desulfation is very slow. Above a maximum temperature, the LNT 105 may be damaged.

The LNT 105 is heated in part by heat convection from the reformer 104. To generate this heat, fuel can be supplied to the reformer 104 under lean conditions, whereby the fuel combusts in the reformer 104. Once the reformer 104 is heated, the fuel injection rate can be controlled to maintain the temperature of the reformer 104 while the LNT 105 are heating.

Treatment of $NO_x$ Sensor Data

The controller 108 uses data from the $NO_x$ sensor 110 to schedule denitrations for the LNT 105. It is possible to schedule denitrations without using a $NO_x$ sensor positioned downstream from the LNT 105, but the use of such a sensor is widely considered desirable. The sensor can be used to track whether emission control objectives are being met, to measure the current efficiency of the LNT 105, and/or to determine how much $NO_x$ is currently being removed from the exhaust by the LNT 105 as part of a calculation of how much $NO_x$ the LNT 105 has adsorbed since its last denitration.

It is known that sensors do not provide strictly accurate information and it is usual to process sensor data in various ways prior to using it in control algorithms. The data from the $NO_x$ sensor 110 can be inaccurate due to random perturbations and noise that affects the measurements. Data is also inaccurate in that it is not current due to lag in obtaining measurements. In general, the data is processed through a state estimator, which can be any algorithm used to determine the state of a system from data. A state estimator can be a simple filter or it can use a model of the system, in which case it may be referred to as an observer. State estimators can operate in numerous ways, e.g., providing moving time averages, discarding outliers in a sequence of measurements, and/or estimating the state in a manner that balances what can be expected based on a model with what the sensor is asserting. The state in this case is a $NO_x$ concentration downstream from the LNT 105, although the state can be more complex than a single $NO_x$ concentration. The $NO_x$ concentration can be either upstream or downstream of the ammonia-SCR catalyst 106.

The inventors have found that a typical $NO_x$ sensor downstream from an LNT, is particularly unreliable in periods immediately following the rich phases used to regenerate the LNT. After some amount of lean operation, the sensor data again become more reliability. The reason for the periods of unreliability is not known. The inventors have determined that control using a $NO_x$ sensor downstream from an LNT is improved if the sensor data is ignored or at least given reduced weight in a period immediately following a rich regeneration.

In one embodiment, the data from the $NO_x$ sensor from a period immediately following a denitration is ignored or discarded. The period may be fixed or variable, predetermined or event-based. A variable period could be based, for example, on the time taken for the engine 101 to use a certain amount of fuel or generate a certain volume of exhaust. An event-based period could be a period that ends based on an observation of the $NO_x$ sensor data indicating the $NO_x$ sensor data is again reliable. If the decision to begin denitration is based on a progressive calculation made using the $NO_x$ sensor data, such as a calculation of the amount of $NO_x$ taken up by the LNT 105, estimates can be used in place of the data over the period. If the decision to begin denitration can be triggered by a single $NO_x$ sensor reading, the trigger is prevented over the period.

Figure 2:
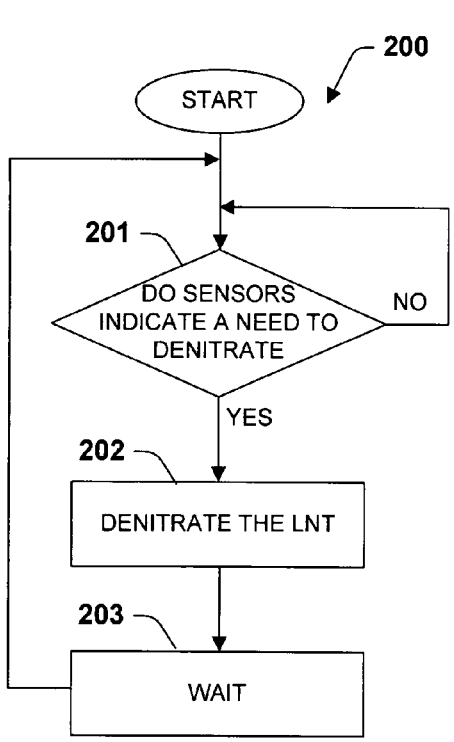
FIG. 2 is a flow chart of a control process that ignores sensor data in a period following denitration.

FIG. 2 provides a flow chart of a control process 200 providing an exemplary implementation of this method. Block 201 makes the decision whether to initiate denitration based on sensor data. Once the decision is made, the process proceeds to block 202 where denitration is carried out. Following denitration, rather than immediately returning to block 201, the process dwells in block 203, allowing time to pass until the sensor data can again be considered sufficiently reliable. After waiting for a period in block 203, the process returns to the decision block 201.

In another embodiment, data from the $NO_x$ sensor 110 is given reduced weight over the period. Reduced weight can be implemented through an observer, for example. An observer can include a parameter related to an estimate of the contribution of noise to the sensor measurement. Such a parameter can be altered to reflect the greater contribution of noise over the period, whereby some useful information can be salvaged. Subsequent to the period, the weight given to the $NO_x$ sensor data as it relates to a decision whether to begin denitrating is again increased.

Regenerating Only when Two Criteria are Met

Another concept that addresses the general issue of $NO_x$ sensor data reliability is to require that two separate criteria be met before initiating a denitration. A first criteria relates to the amount of $NO_x$ stored in the lean $NO_x$ trap 105 or remaining $NO_x$ storage capacity of lean $NO_x$ trap 105. The second criteria relates to the current performance of the exhaust aftertreatment system 103, or a portion thereof, as determined from one or more measurements of $NO_x$ concentration in the exhaust. The first criteria ensures that denitration will not begin prematurely due to noise or brief events affecting the $NO_x$ sensor data. Requiring that the second criteria also be satisfied before beginning denitration allows the lean phases to be extended beyond the conservative limits that must be used if the first criteria is the only criteria.

Extending the lean phases when permissible based on the second criteria reduces the frequency of regeneration, which allows emission control targets to be reached at a reduced fuel penalty. Fuel penalty is reduced in that reductants are used more efficiently when $NO_x$ loading is high. Fuel penalty is also reduced in that there is generally a start-up fuel penalty for beginning denitrations; reducing the frequency of denitration reduces the number of start-up penalties that are incurred. Finally, with the SCR catalyst 106 configured downstream from the LNT 105, fuel penalty is reduced in that ammonia production is greater when denitration is postponed to higher $NO_x$ loading. Ammonia removes $NO_x$ from the exhaust by reaction over the SCR catalyst 106 without fuel penalty.

The first criteria relates to the accumulation of $NO_x$ in the LNT 105. The accumulation of $NO_x$ in the LNT 105 can be characterized either in terms of the amount of $NO_x$ stored in the LNT 105 or the amount of $NO_x$ storage capacity remaining in the LNT 105. Either case generally involves estimating and integrating the rate at which $NO_x$ is being stored in the LNT 105 and estimating the storage capacity of the LNT 105. Amounts can be expressed as percentages of capacity. Saturation is $NO_x$ loading as a fraction of a theoretical loading limit.

Any suitable method can be used to estimate the rate at which $NO_x$ is being stored in the LNT 105. In one embodiment, the rate of accumulation is calculated by multiplying the volumetric flow rate of the exhaust by the difference between the $NO_x$ concentration upstream from the LNT 105 and the $NO_x$ concentration downstream from the LNT 105. This is the preferred method if the $NO_x$ sensor 110 is located upstream from the SCR catalyst 106. Preferably, the volumetric flow rate of the exhaust and the $NO_x$ concentration upstream from the LNT 105 are estimated from an engine map, whereby sensors are not required to determine these quantities.

In another embodiment, the rate of accumulation is calculated by multiplying the flow rate of $NO_x$ into the LNT 105 by an estimate of the LNT 105's $NO_x$ removal efficiency. This is the preferred method if the $NO_x$ sensor 110 is downstream from the SCR catalyst 106. The efficiency of the LNT 105 can be estimated from a model. A model can take into account one or more variables affecting LNT efficiency such as the LNT temperature, LNT $NO_x$ loading, LNT $SO_x$ loading, and exhaust flow rate.

The second criteria relates to current performance of the exhaust aftertreatment system 103 as determined using data from the $NO_x$ sensor 110. The performance can be of the LNT 105 alone or of the LNT 105 in combination with the SCR catalyst 106. Any suitable performance measure can be used. Examples of potentially suitable performance measures include the concentration to which $NO_x$ is reduced, the fraction of $NO_x$ removed from the exhaust by one or more aftertreatment devices including the LNT 105, and the $NO_x$ emission or slip rate. The $NO_x$ emission rate can be normalized. Normalizing with respect to the engine bhp-hr makes the measure relate directly to certain emission control standards.

$NO_x$ removal efficiency measurements can also be normalized. In one embodiment, the efficiency is normalized for exhaust flow rate. Exhaust flow rate has a strong effect on observed $NO_x$ removal efficiency. An efficiency measurement normalized for exhaust flow rate gives a more accurate reading of the condition of the exhaust aftertreatment system 103, or a portion thereof, than a measure that is not so normalized. Likewise, an efficiency measure can be normalized for temperature. Normalizing for temperature is done based on an expression that gives the temperature dependence of the $NO_x$ removal efficiency. By removing the effect of temperature dependence, the efficiency measure relates more directly to the effect of the current $NO_x$ loading level on the efficiency of the LNT 105.

Denitration, once begun, can proceed to any suitable endpoint. Denitration can extend for a fixed period or until a fixed amount of reductant has been supplied. Optionally, the length of denitration is based at least in part on the estimated $NO_x$ loading of the LNT 105. In one embodiment, denitration proceeds to reduce the $NO_x$ loading to a target level. The target level can be fixed or variable. An example of a variable target would be one that depends on the $NO_x$ loading at the beginning of the denitration. If denitration was begun at a comparatively low $NO_x$ loading due to the criteria relating to current performance of the exhaust aftertreatment system 103 being met relatively early, it may be desirable to denitrate to a greater degree in order to keep the regeneration frequency relatively low.

Figure 3:
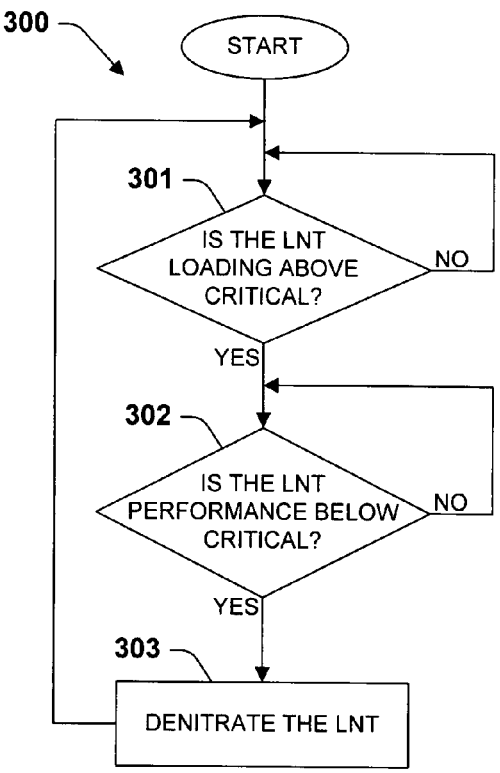
FIG. 3 is a flow chart of a control process in which regeneration does not proceed unless two different criteria are satisfied.

FIG. 3 provides a flow chart of an exemplary control process 300 implementing this concept. The process begins in a lean phase where $NO_x$ is accumulating in the LNT 105. Block 301 checks whether the LNT 105 has become saturated with $NO_x$ to a critical level. If yes, the process proceeds to block 302, which checks whether the LNT efficiency has fallen below a limit. With the second yes, the process proceeds to block 303 where denitration is carried out. The estimate of LNT saturation used in block 301 is reduced to a degree commensurate with the extent of denitration. Denitration also restores the LNT efficiency. When denitration is complete, the process returns to a lean phase and block 301.

The concept of beginning a regeneration only when two criteria are met, one relating to current performance of the LNT 105 and the other relating to loading or remaining capacity, is also applicable to desulfation. $SO_x$ loading can be estimated based on fuel usage since the last desulfation, optionally modified by an $SO_x$ uptake efficiency for the LNT 105. The current performance as it relates to sulfur loading can be determined in any suitable manner. One measure of performance affected by sulfur loading is the frequency with which regeneration is required. Another measure of current performance as it relates to sulfur loading is $NO_x$ removal efficiency of the LNT 105 as measured shortly after a thorough denitration. Another measure of current performance as it relates to sulfur loading is based on the relationship between $NO_x$ removal efficiency and $NO_x$ loading; if after taking into account the effect of current conditions such as LNT temperature and exhaust flow rate it is apparent the $NO_x$ removal efficiency is low in comparison to what would be expected from the LNT 105 in a desulfated condition at the current level of $NO_x$ loading, the need for desulfation is indicated.

Balancing Urgency of the Need to Regenerate Against Conduciveness

Another of the inventors' concepts is to balance the need for regeneration against the conduciveness of current conditions to regeneration, whereby early regeneration is favored when conditions are conducive. If conduciveness to regeneration were always the same, it would be desirable to postpone denitration until denitration became imperative. The inventors have found, however, that for typical vehicle operation exhaust conditions change frequently and dramatically, whereby a regeneration strategy that ignores changing conditions is far from optimal. From time-to-time, conditions that are highly favorable to regeneration occur making early regeneration preferable to postponing regeneration until $NO_x$ loading of the LNT 105 is higher. Likewise, particularly unfavorable conditions may occur from time-to-time. At some point, it becomes preferable to regenerate earlier than necessary to reduce the risk that regeneration will be required under particularly unfavorable conditions that might subsequently occur.

The balancing determines a threshold for regeneration. A threshold is a point where some measure of the state and or performance of an exhaust aftertreatment system, or some portion thereof comprising an LNT, reaches a critical value at which regeneration is triggered. The threshold can be assigned one of several possible points based the conditions that determine favorability. Preferably, however, the threshold is varied according to a continuous function of some measure of the favorability of conditions.

The threshold defines a criteria that is met if some measure of the exhaust aftertreatment system 103's, or a portion thereof's, state or performance has reached a critical value. The measure relates to the urgency of the need to regenerate. Any suitable measure can be used in the criteria. The measure can relate to current performance of the exhaust aftertreatment system 103 as determined using data from the $NO_x$ sensor 110. Alternatively, without limitation, the measure can relate to the accumulation of $NO_x$ in the LNT 105.

Determining whether the criteria has been met and the threshold crossed can be done in any suitable fashion. In one example, the determination is made by comparing the measure of the exhaust aftertreatment system 103's state or performance to the threshold value. In another example, one value is generated based on the conduciveness of conditions to regeneration, another value is generated based on the urgency of the need to regenerate, and the determination made by weighing the two values against one another in a formula (balancing the factors). In the later example, a threshold value the exhaust aftertreatment system 103's state or performance may not be explicitly determined, although such a value exist in a mathematical sense.

The urgency of the need to regenerate can be related to a comparison between a measure of the exhaust aftertreatment system 103's state or performance and a critical value at which regeneration is considered imperative. The urgency can be placed on a scale beginning from where the urgency is at its lowest and ending where regeneration is imperative to avoid violating an emission limit. For example, if the measure of urgency is a $NO_x$ emission rate in terms of g/bhp-hr, the urgency can be assigned a value of zero when the emission rate is zero and one when the emission rate is at a mandated not-to-exceed limit, the urgency varying linearly for values between.

As used herein, conduciveness of conditions to regeneration assumes that regeneration is possible and focuses on the fuel penalty for regeneration. Accordingly, conduciveness of conditions to regeneration is determined by considering one or more conditions that affect the fuel penalty for regeneration. Some of the most important conditions that affect the fuel penalty include the exhaust oxygen flow rate, the exhaust oxygen concentration, and the exhaust flow rate. Low oxygen flow rate means less reductant is consumed removing oxygen from the exhaust over the course of regeneration. Low oxygen concentration relates to low oxygen flow rate, but also relates to the ability to operate the fuel reformer 104 with little or no fuel pulsing. When oxygen concentrations are high, pulsed operation may be necessary to prevent overheating. Low exhaust flow rate also relates to low oxygen flow rate, but also relates to efficient reductant usage due to long residence times. Potential exhaust conditions achievable by throttling the engine air intake or changing the transmission gear ratios while maintaining the engine's power output can be determined from current conditions and can themselves be considered current conditions.

The conduciveness of conditions to regeneration can be related to the engine speed-load state information. At steady state, exhaust conditions such as flow rate and oxygen concentration are related to the engine's speed-load point. Accordingly, the engine speed-load point can be used to estimate conduciveness of conditions to regeneration. During transient operation, the exhaust conditions depend on the speed-load history as well as the current speed-load. In particular, it has been observed that a favorable combination of low exhaust flow rate and low exhaust oxygen concentrations often occur during positive speed gradients and positive load gradients. Thus, if conduciveness of conditions to regeneration is determined from speed-load state information, it is preferably that speed and load gradient be considered in addition to the engine 101's current speed-load point.

Conduciveness can be placed on a scale beginning where conditions are least conducive and ending where conditions are most conducive. For example, a value of zero can be assigned to the condition where the exhaust oxygen flow rate is at its highest and a value of one can be assigned to the condition where the exhaust oxygen flow rate is at its lowest (for a running engine), with the numerical value measuring conduciveness varying linearly in between.

Balancing or the urgency and conduciveness factors can take place in any suitable manner. For example, the numerical factors can be added or multiplied together, and the result checked to determined whether a threshold to begin regeneration has been reached. Equivalently, the conduciveness factor can be used to set a critical value against which the urgency measure is checked. For example, where the urgency measure is based on $NO_x$ emission rate in terms of g/bhp-hr, the critical emission rate after which regeneration is initiated can be reduced in proportion to the magnitude of the conduciveness factor. As another example, where the urgency measure is based on the $NO_x$ storage capacity remaining in the LNT 105, the capacity threshold at which denitration begins can be increased in proportion to the magnitude of the conduciveness factor, whereby the threshold is reached more quickly if the conduciveness is high.

Denitration, once begun, can proceed to any suitable endpoint. Denitration can proceed to a fixed endpoint or to an extent that depends only the factors affecting urgency of the need to regenerate. Optionally, however, the length of denitration is based in part on the on the conduciveness of conditions to regeneration. Preferably, the denitration proceeds to a greater extent if conditions are conducive to denitration and to a lesser extent if conditions are not conducive. The endpoint target can be revised as conditions change over the course of a denitration. For example, if conditions worsen, denitration can be ended earlier. An endpoint for regeneration can be defined in any suitable fashion, but typically the endpoint is determined from an estimate of how much $NO_x$ has been removed from the LNT 105 or how much $NO_x$ remains in the LNT 105.

Figure 4:
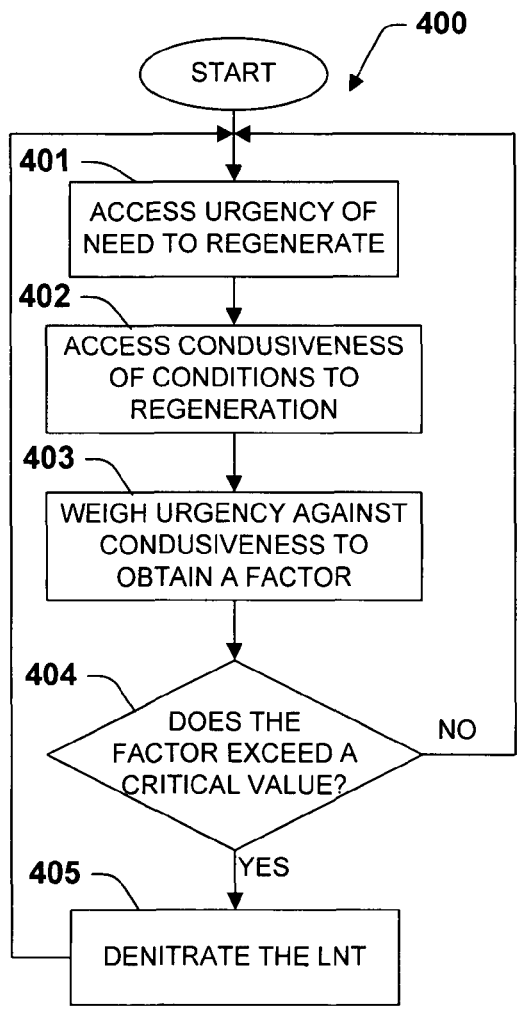
FIG. 4 is a flow chart of a control process in which the urgency of the need to regenerate is weighed against the conduciveness of conditions to denitration.

FIG. 4 provides a flow chart of an exemplary control method 400 in which conduciveness of conditions to regeneration is balanced against the urgency of the need to regenerate. The process begins in a lean phase in block 401. In block 401, the urgency of the need to regenerate is assigned a numerical value. For example, the urgency can be based on a $NO_x$ removal efficiency of the aftertreatment system 103 and assigned a value based on a current estimate of the $NO_x$ removal efficiency in such a way that the value increases and approaches 1.0 as the minimum acceptable efficiency is approached.

In block 402, a numerical value is assigned to the conduciveness of current conditions to regeneration. For example, the conduciveness can be based on the exhaust oxygen flow rate and can be assigned in such a way that the value is zero when the exhaust oxygen flow rate is at its highest and the value is 0.7 when the exhaust oxygen flow rate is at its lowest.

In block 403 the numerical values assigned to conduciveness and urgency are combined into a single factor that can be tested to determine whether to regenerate. In this example, the numerical values are simply added together to generate the factor.

The factor is tested in block 404 to determined whether to initiate regeneration. For example, the test can be whether the factor exceeds 1.0. If yes, denitration is begun in block 405. If no, the method returns to repeat blocks 401-404.

Regenerating Earlier when Demands Placed on the Emission Control System are Greater The inventors have also recognized that for measures of the urgency of the need to regenerate that relate only to the state of the exhaust aftertreatment system 103 and for many measures of the performance of the exhaust aftertreatment system 103 the urgency is less than indicated by the measure for some operating conditions than for others. Accordingly, another of the inventors' concepts is to balance a measure or the state or performance of the exhaust aftertreatment system 103, or a portion thereof, with the demands currently being placed on the exhaust aftertreatment system 103 by a vehicle operating state in making the decision whether to regeneration. The balancing affects a critical value for the measure of state or performance at which regeneration is initiated.

The critical value that is changed based on conditions can be associated with any of the usual criteria used to determine when to initiate an LNT regeneration. For example, the criteria can relate to current performance of the exhaust aftertreatment system 103 as determined using data from the $NO_x$ sensor 110, to the accumulation of $NO_x$ in the LNT 105, or to remaining $NO_x$ storage capacity in the LNT 105.

The demands being placed on the aftertreatment system 103 are primarily a function of the operating state of the engine 101. The demands are generally greater when the exhaust flow rate is greater, when the engine 101 is producing more $NO_x$, or when the engine 101 is producing an exhaust outside the optimal temperature range for the treatment by exhaust aftertreatment system 103. At higher exhaust flow rates, residence times are shorter and a greater activity of the devices in the exhaust treatment system 103 is required to achieve a target degree of emission control. When the engine 101 is producing more $NO_x$, particularly when the engine 101 is producing more $NO_x$ on a g/bhp-hr basis, a greater fraction of the $NO_x$ must be removed from the exhaust by the exhaust aftertreatment system 103. When the exhaust cools or heats the LNT 105 to outside its optimal operating temperature range, the LNT 105's effectiveness becomes unacceptably low at a lower $NO_x$ loading than when the LNT 105 is within an optimal temperature range.

Optionally, the demands on the aftertreatment system can be related to an engine map. In general, demands are greatest when the engine 101 is in a high-speed, high-load condition. It is desirable to trigger regeneration sooner when the engine 101 is in a high-speed high-load condition, whereas regeneration can be postponed until $NO_x$ loading is greater and the performance of the LNT 105 has declined to a greater degree if less demanding conditions prevail. The demands also relate to the recent speed-load history, as may be characterized by the speed-load gradient, however, it is less useful to consider such transient effects when evaluating current demands. Conditions persisting on the scale of minutes are of most relevance to current demands, whereas speed and load gradients tend to last for only a few seconds.

The applicable measure of demand depends on the criteria in question. For example, if the criteria relates to the amount of $NO_x$ stored by the LNT 105 or the remaining storage capacity of the LNT 105, the exhaust flow rate, the exhaust temperature, and the engine $NO_x$ production rate are all relevant measures of demand. If the criteria relates to efficiency of the LNT 105 as determined using a sensor 110, of the foregoing measures only the engine $NO_x$ production rate is relevant as exhaust flow rate and exhaust temperature directly affect the LNT efficiency measurement. By contrast, $NO_x$ emission rates increase with $NO_x$ production rates even as LNT efficiency remains constant. A greater LNT efficiency may be required to meet emission limits when the engine 101 is producing more g/bhp-hr $NO_x$ or a higher concentration of $NO_x$, the requirements depending on the emission limits. As the demands placed by the engine 101 on the aftertreatment system 103 increase, the threshold for regeneration is lowered and vis-a-versa.

The measure of demand can be used to modify the critical value in any suitable fashion. For example, the critical value can be set to one of several possible values depending on the measure. As a more specific example, a loading threshold at which denitration is initiated can be set to a lower value if the engine 101 is in a high speed-high load condition as compared to the value used at other times. As another example, the critical value can be made a continuous function of the measure of demand. Specific examples include linearly decreasing a $NO_x$ loading threshold at which regeneration begins as exhaust flow rate increases and linearly increasing an LNT efficiency threshold a which regeneration begins as engine $NO_x$ emission rate on a g/bhp-hr basis increases.

Figure 5:
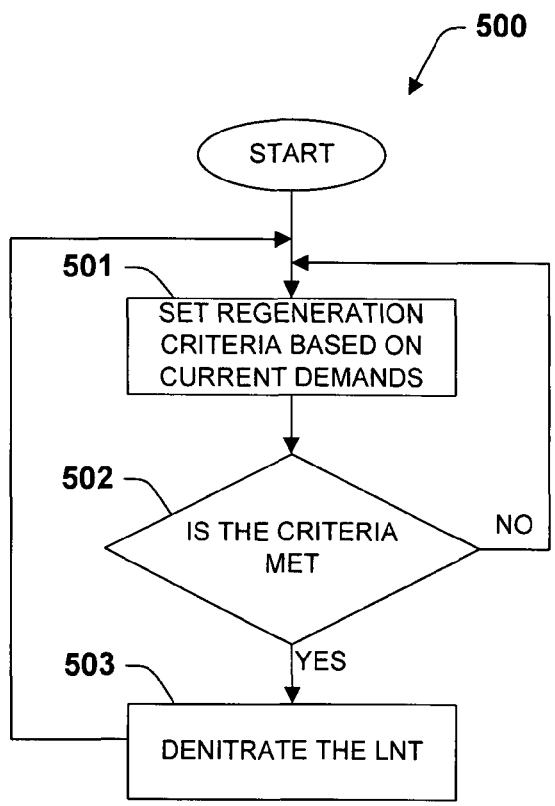
FIG. 5 is a flow chart of a control process in which a threshold for regeneration is set based on the demands being placed on the exhaust aftertreatment system.

FIG. 5 is a flow chart of an exemplary control method 500 in which a regeneration threshold is set based on current demands placed by the engine 101 on the exhaust aftertreatment system 103. The method begins in block 501 during a lean phase. In block 501, a regeneration criteria is set based on current conditions. For example, demands can be related to the speed-load state of the engine 101 and using a map from the speed-load state, a saturation threshold at which regeneration begins can be set In block 502, a determination is made whether the criteria is met; in this case whether the saturation exceeds the threshold. If the criteria is met, the method proceeds to block 503, wherein regeneration takes place. If the criteria is not met, the method returns to block 501, wherein the criteria is reset for the next iteration based on the then current demand level and subsequently tested in block 502 against the updated condition of the exhaust aftertreatment system 103.

A related concept is to vary the endpoint for regeneration based on current demands, When demands placed on the exhaust aftertreatment system 103 are high, it may be necessary to regenerate extensively to maintain sufficient emission control performance without regenerating overly frequently. Likewise, when demand are comparatively low, it may be sufficient to regenerate to a much lesser extent, and it may be desirable to regenerate to a lesser extent in order to take advantage of the greater efficiency when regenerating at higher loadings. This concept can be implemented by setting a threshold, such as saturation level, for ending regeneration based on the current demand state.

The concepts of varying starting and ending points for denitration based on current demands is also applicable to desulfation. It can be desirable to postpone desulfation and terminate desulfation early for several reasons. One reason is that ammonia production has been observed to increase with sulfur loading. Another reason is that more sulfur can be removed per unit time at higher sulfur loadings; if sulfur is removed at high loadings rather than low loadings, total desulfation time is reduced. Reducing desulfation time is valuable in that LNTs generally age and undergo deactivation in proportion to the time they remain at desulfation temperatures. Reducing desulfation time without increasing desulfation temperatures extends LNT life.

Combined Method

Figure 6:
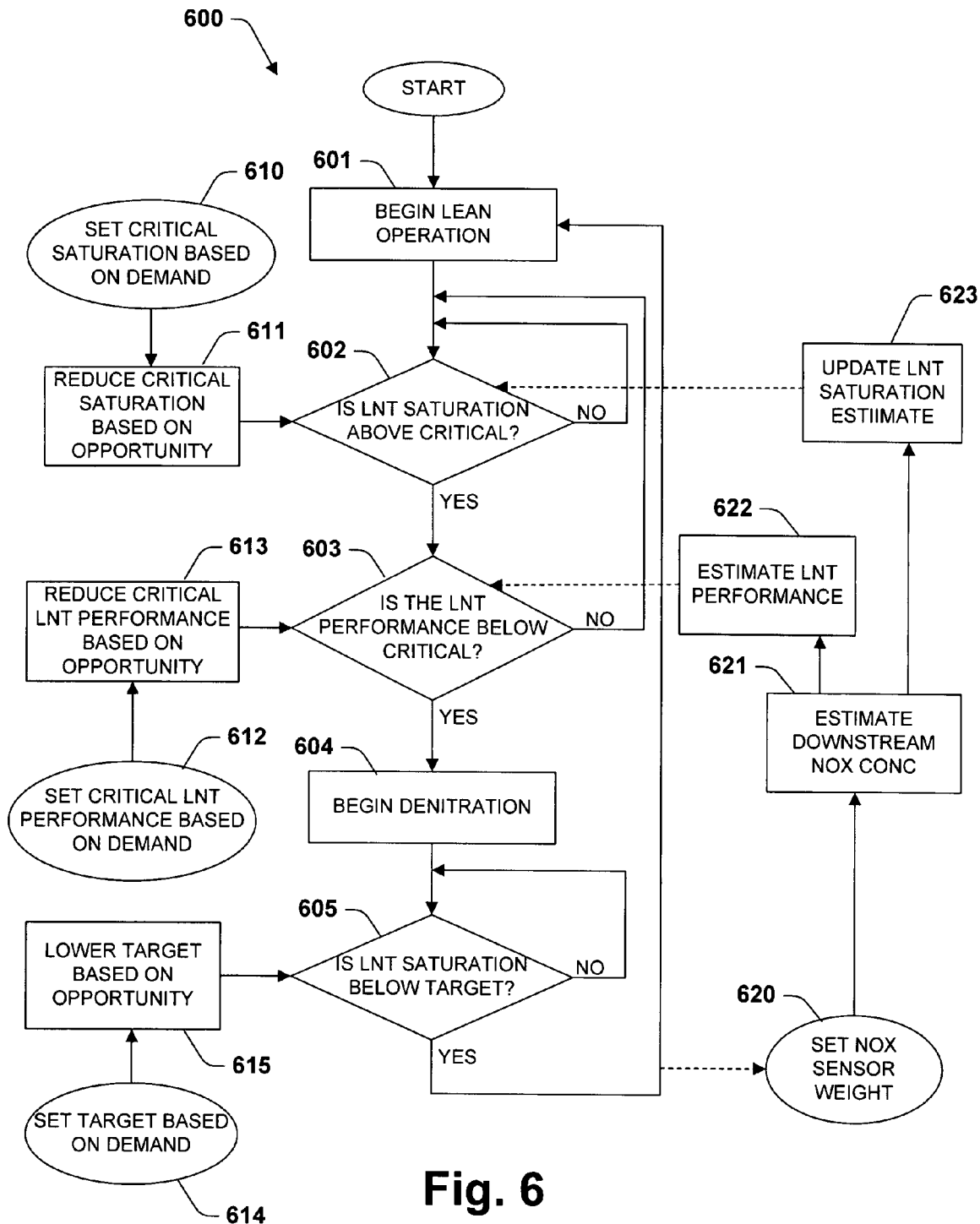
FIG. 6 is a flow chart of an exemplary control process implementing several of the inventors' concepts.

FIG. 6 is a flow chart of a denitration control process 600 combing several of the inventors' concepts. The method starts in block 601, which is the beginning of lean operation during which the LNT 105 is accumulating $NO_x$. The method proceeds to block 602, which checks whether the saturation of the LNT 105 has exceeded a critical level. The saturation of the LNT 105 is the amount of $NO_x$ stored in the LNT 105 normalized by a theoretical maximum. If it the saturation has exceeded a critical amount, the method proceeds to block 603, which checks whether the $NO_x$ mitigation performance of the LNT 105 has fallen below a critical value. If the $NO_x$ mitigation performance of the LNT 105 has fallen below a critical value, the method proceeds to block 604, which initiates rich regeneration. If either the test of block 602 or 603 is failed, both tests are repeated at the next iteration. If the test of block 603 fails, the test of block 602 is repeated even though it was previously passed because the criteria applied for the next iteration may be different and may demand a higher level of saturation prior to allowing regeneration.

After regeneration begins in block 604, the process 600 proceeds to block 605, which checks whether a criteria relating to the end of denitration has been met. In this example, the criteria relates to a $NO_x$ saturation of the LNT 106. A saturation estimate is maintained throughout the process 600, whereby the estimate increases as the lean phase progresses and decreases as the rich phase progresses. The increase and decrease rates are estimated with models. The regeneration process continues until the saturation is reduced to the target level, whereupon a new lean phase is begun in block 601.

Several processes occur in parallel to the core process defined by blocks 601-605. The process defined by blocks 610 and 611 updates the critical value against which the LNT saturation is tested in block 602. Block 610 sets a maximum saturation that the LNT 106 can be allowed to reach. This saturation is based on the requirements of the current operating state of the power generation system 100. The speed-load point of the engine 101 is a primary factor determining those requirements. In one example, the maximum saturation is determined based on a map from the current speed-load point. A map can take the form of a table or a functional formula, for example.

Block 611 lowers the critical value based on the conduciveness of current conditions to regeneration. In general, the more conducive the current conditions are, the more the critical value is lowered. A principle factor in determining conduciveness is the exhaust state, which is primarily a function of the engine speed-load history. Accordingly, the reduction in critical saturation applied in block 611 can be determine based on another map from the current speed-load point, optionally modified based on an engine speed or load gradient.

Blocks 610 and 611 combine to determine one critical value. The considerations applied by blocks 610 and 611 are different and the parameters affecting the outcomes of these block can be different, but the two blocks together lead to one result. The process of block 610 and 611 can be combined by defining one map that directly relates the parameters used by the two blocks collectively to the final decision as to the critical value that will be applied in block 602. Thus the target saturation can be set based on both the demand for $NO_x$ mitigation under current condition and conduciveness of current conditions to regeneration in one step.

Another parallel process is defined by blocks 612 and 613. The blocks are analogous to those of block 610 and 611, except that instead of determining a critical saturation, they determine a critical $NO_x$ mitigation performance of the LNT 105 or of the LNT 105 in combination with the SCR catalyst 106. These two operations can also be combined into one. Another parallel process is defined by blocks 614 and 615, which determine the endpoint for denitration. The description of these blocks parallels that of blocks 610 and 611.

Additional sub-processes are defined by blocks 620-623, which relate to the determinations of LNT performance and LNT saturation used in the comparisons of blocks 602 and 603. At the completion of denitration in block 605, a signal is passed to block 620 which begins a program of $NO_x$ sensor data weighting for a post regeneration phase. Block 620 produces weighting factors which change over time and are used by block 621. Block 621 estimates a $NO_x$ concentration downstream from the LNT 106. Block 621 uses information from a $NO_x$ sensor and from a model of the system 100. The model can use various information, such as the speed-load point of the engine 101. Block 621 can be, for example, a Kalman filter. The weighting factors supplied by block 620 cause block 621 to give less weight to the $NO_x$ sensor data in a period immediately following the completion of a denitration. The $NO_x$ concentration estimate is used to estimate $NO_x$ mitigation efficiency in block 622 and to update the estimate of LNT saturation in block 623.

Setting Regeneration Threshold Based on Engine Speed Load Information

An alternate way of viewing some of the inventors' concepts is in terms of the types of parameters that are considered in setting a threshold for initiating denitration. As shown by the foregoing, at least two of the inventors' concepts involve consideration of speed-load information from the engine 101 and using that information together with an independent determination of the state and or performance of the exhaust aftertreatment system 103 in determining the time at which to begin regeneration. Accordingly, another of the inventors concepts is a method of scheduling denitration wherein a threshold for denitration is varied based on engine speed-load information. The threshold is a critical value for a measure of state and/or performance of the exhaust aftertreatment system 103 or a portion thereof comprising an LNT 105.

The threshold can be set in view of multiple consideration with the ultimate objective generally being to minimize the fuel penalty for operating the exhaust aftertreatment system. As noted above, some operating conditions allow regeneration to be postponed due to lower demands for exhaust aftertreatment but where regeneration can be postponed, it is still sometimes desirable to advance regeneration timing to take advantage of opportune conditions and to avoid adverse conditions that may subsequently occur. Taking all the consideration together, there is an optimal threshold that can be associated with an engine speed-load point or an engine speed-load point in combination with historical engine speed-load information, such information determining the engine speed-load gradient.

Any suitable approach can be used to determine the map from engine speed-load information to the threshold. In one embodiment, a set of data provides training examples used determine the map. Data from vehicle operating cycles is valuable in that it captures information going beyond current operating conditions. For example, in terms of opportunistic regeneration, it is best to consider more than just the degree to which current condition are conducive to regeneration in deciding how much to alter the threshold and advance regeneration timing. In addition to their conduciveness, the likelihood of current conditions to persist is relevant. When persistence is more likely, there is less advantage to advancing the regeneration timing than if persistence is less likely. Thus, in building the map, it is desirable to process the training examples to capture any correlation between the speed-load point and gradient and the persistence of conditions at that speed-load point and gradient. Such correlations can be captured by processing the training examples in a suitable manner. One option is to build a probabilistic dependency model that can be used to calculate optimal thresholds to use for regeneration as a function of engine speed-load point or speed load point in combination with speed-load gradient. In general, even better performance can be obtained by considering additional parameters to engine speed-load information in setting the thresholds. Additional parameters could relate, for example, to the exhaust system state, e.g., LNT temperature, to the vehicle speed, or to the engine speed-load history.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a power generation system, comprising:
    operating a diesel engine to produce a lean exhaust comprising $NO_x$;
    passing the lean exhaust through an exhaust aftertreatment system comprising a lean $NO_x$ trap to adsorb a portion of the $NO_x$ from the exhaust; and
    selectively denitrating the lean $NO_x$ trap based on the $NO_x$ loading of the lean $NO_x$ trap reaching a critical amount wherein the critical amount is varied according to the exhaust flow rate;
    wherein denitrating the lean $NO_x$ trap comprises providing an overall rich exhaust-reductant mixture to the lean $NO_x$ trap, whereby the lean $NO_x$ trap releases and reduces stored $NO_x$; and
    the critical amount is varied so as to lower the $NO_x$ saturation at which denitration takes place when the exhaust flow rate increases.

2. A method of operating a power generation system, comprising:
    operating a diesel engine to produce a lean exhaust comprising $NO_x$
    passing the lean exhaust through an exhaust aftertreatment system comprising a lean $NO_x$ trap to adsorb a portion of the $NO_x$ from the exhaust;
    selectively denitrating the lean $NO_x$ trap based on the $NO_x$ loading of the lean $NO_x$ trap reaching a threshold; and
    setting the loading threshold based on operating conditions to advance regerneration when the operating conditions place high performance demands on the exhaust aftertreatment system, independently of the way those conditions affect the state of the exhaust aftertreatment system, and to postpone regeneration when the operating conditions place comparatively lower demands on the exhaust aftertreatment system;
    wherein the state of the exhaust aftertreatment system consists of the $NO_x$ loading, the $NO_x$ storage capacity, and the temperature of the lean $NO_x$ trap;
    denitrating the lean $NO_x$ trap comprises providing an overall rich exhaust-reductant mixture to whereby the lean $NO_x$ trap, whereby the lean $NO_x$ trap releases and reduces stored $NO_x$; and
    the threshold is set according to one or more of the exhaust oxygen flow rate, the exhaust oxygen concentration, and the exhaust flow rate.

* * * * *